(12) United States Patent
Murata

(10) Patent No.: US 8,804,188 B2
(45) Date of Patent: Aug. 12, 2014

(54) COMPUTER-READABLE STORAGE DEVICE STORING PAGE-LAYOUT PROGRAM AND INFORMATION PROCESSING DEVICE

(71) Applicant: Mareyuki Murata, Kuwana (JP)

(72) Inventor: Mareyuki Murata, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 31 days.

(21) Appl. No.: 13/729,320

(22) Filed: Dec. 28, 2012

(65) Prior Publication Data

US 2013/0169977 A1 Jul. 4, 2013

(30) Foreign Application Priority Data

Dec. 28, 2011 (JP) .................................. 2011-288735

(51) Int. Cl.
*G06K 15/02* (2006.01)

(52) U.S. Cl.
USPC ........... 358/1.2; 358/1.18; 358/451; 715/243; 715/253; 715/277

(58) Field of Classification Search
None
See application file for complete search history.

(56) References Cited

U.S. PATENT DOCUMENTS

2007/0070442 A1   3/2007   Ohkubo

FOREIGN PATENT DOCUMENTS

JP           2007-88767 A        4/2007

*Primary Examiner* — Paul F Payer
(74) *Attorney, Agent, or Firm* — Scully, Scott, Murphy & Presser, P.C.

(57) ABSTRACT

A technique is presented for making effective use of sheets when the total number of pages to be printed on a sheet is changed after the number of pages per sheet was originally specified. In one aspect, the technique is implemented on an apparatus that accepts a specified number of pages per sheet, obtains a page group having a number of pages, determines whether the number of pages in the page group has changed, changes the specified number of pages per sheet when the number of pages in the page group has changed, and generates output data of the pages with the specified number of pages when the number of pages in the page group has not been changed, and generates the changed number of pages when the number has been changed.

20 Claims, 12 Drawing Sheets

TWO PAGES ARE DETAILED

COMPUTER-READABLE STORAGE DEVICE STORING PAGE-LAYOUT PROGRAM AND INFORMATION PROCESSING DEVICE

CROSS-REFERENCE TO RELATED APPLICATION

This application claims priority to Japanese Patent Application No. 2011-288735, filed on Dec. 28, 2011, which is incorporated herein by reference.

TECHNICAL FIELD

Aspects of the disclosure relate to a technique for laying out a plurality of pages in one or more sheets.

BACKGROUND

In a known technique, when a page is deleted from N pages to be laid out on one side of a sheet while a size of each page is reduced, one or more pages following the deleted page are moved up in the current layout order. When a blank page is inserted somewhere between two pages of N pages to be laid out in the same situation, one or more pages following the blank page are moved back in the current layout order.

SUMMARY

However, when the total number of pages, e.g., N pages, is changed due to the deletion or addition of one or more pages, wasted space may appear on the sheet or the number of sheets to be used may increase.

Aspects of the disclosure provide for a technique for making effective use of sheets when the total number of pages to be printed is changed after the number of pages per sheet was specified.

An novel information processing apparatus is presented. The apparatus is configured to accept a specified of a number of pages per sheet laid out on one sides of a sheet; obtain a page group including one or more pages; determine whether a total number of pages in the page group has been changed; change the specified number of pages per sheet when the total number of pages in the page group has been changed; generate output data of the pages included in the page group in which the pages are laid out on each of one or more sheets in accordance with the specified number of pages per sheet, when the total number of pages in the page group has not been changed; and generate output data of the pages included in the page group in which the pages are laid out on each of one or more sheets in accordance with the changed number of pages per sheet, when the total number of pages in the page group has been changed.

In one aspect, at least one page is deleted from the page group after the number of pages per sheet are specified; and the specified number of pages per sheet is reduced when the at least one page is deleted. In one aspect, a first size of each page in the page group that is to be laid out on each of the one or more sheets in accordance with the specified number of pages per sheet is calculated; a second size of each page in the page group that is to be laid out on each of the one or more sheets in accordance with the reduced number of pages per sheet is calculated; it is determined whether the second size is smaller than the first size; and the specified number of pages per sheet is used when the second size is smaller than the first size whether or not the at least one page is deleted. In one aspect, a first number of sheets is obtained to be used when the pages remaining in the page group from which the at least one page has been deleted are laid out by using the reduced number of pages per sheet; a second number of sheets is obtained to be used when the pages included in the page group from which no page has been deleted are laid out by using the specified number of pages per sheet; and the specified number of pages per sheet is reduced such that the first number of the sheets to be used does not exceed the second number of the sheets to be used.

In one aspect, a first number of sheets is obtained to be used when the pages remaining in the page group from which the at least one page has been deleted are laid out by using the reduced number of pages per sheet; a second number of sheets is obtained to be used when the pages remaining in the page group from which the at least one page has been deleted are laid out by using the specified number of pages per sheet; and the specified number of pages per sheet is reduced such that the first number of the sheets to be used does not exceed the second number of the sheets to be used. In one aspect, a selection of one of a first changing method and a second changing method is accepted, wherein the first changing method is a method of changing the specified number of pages per sheet to another number of pages per sheet smaller than the specified number of pages per sheet such that a number of sheets to be used when the pages remaining in the page group from which the at least one page has been deleted are laid out by using the another number of pages per sheet does not exceed a number of sheets to be used when the pages included in the page group from which no page has been deleted are laid out by using the specified number of pages per sheet, and the second changing method is a method of changing the specified number of pages per sheet to another number of pages per sheet smaller than the specified number of pages per sheet such that a number of sheets to be used when the pages remaining in the page group from which the at least one page has been deleted are laid out by using the another number of pages per sheet does not exceed a number of sheets to be used when the pages remaining in the page group from which the at least one page has been deleted are laid out by using the specified number of pages per sheet; and the specified number of pages per sheet by using the selected changing method is changed. In one aspect, a selection is accepted of one of a single-sided layout in which the pages are laid out on one side of each of the one or more sheets and a double-sided layout in which the pages are laid out on both sides of each of the one or more sheets; and when the double-sided layout is selected, the number of pages per sheet such that one or more of the pages are laid out on the other side of the last sheet of the one or more sheets is changed. In one aspect, whether a colorant consumption in printing of the pages included in the page group needs to be saved is determined; and the specified number of pages per sheet when the colorant consumption in printing of the pages included in the page group needs to be saved whether or not the total number of pages in the page group has been changed is used. In one aspect, when executed, further cause the information processing apparatus to perform changing the total number of pages in the page group after the number of pages per sheet are specified. In one aspect, printing the output data is performed using one or more of a printer, a copying machine, a facsimile machine, and a scanner.

The one or more aspects of the disclosure may be accomplished in various manners, such as using image processing devices, page layout methods, or computer-readable storage medium storing page layout programs.

According to the one or more aspects of the disclosure, a sheet may be effectively used although the total number of pages to be printed is changed after the number of pages per sheet was specified.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, and the objects, features, and advantages thereof, reference now is made to the following descriptions taken in connection with the accompanying drawing.

DETAILED DESCRIPTION OF EMBODIMENTS

Illustrative embodiments are described in detail with reference to the accompanying drawings.

Hereinafter, a first illustrative embodiment is described with reference to FIGS. 1-11.

Figure 1:
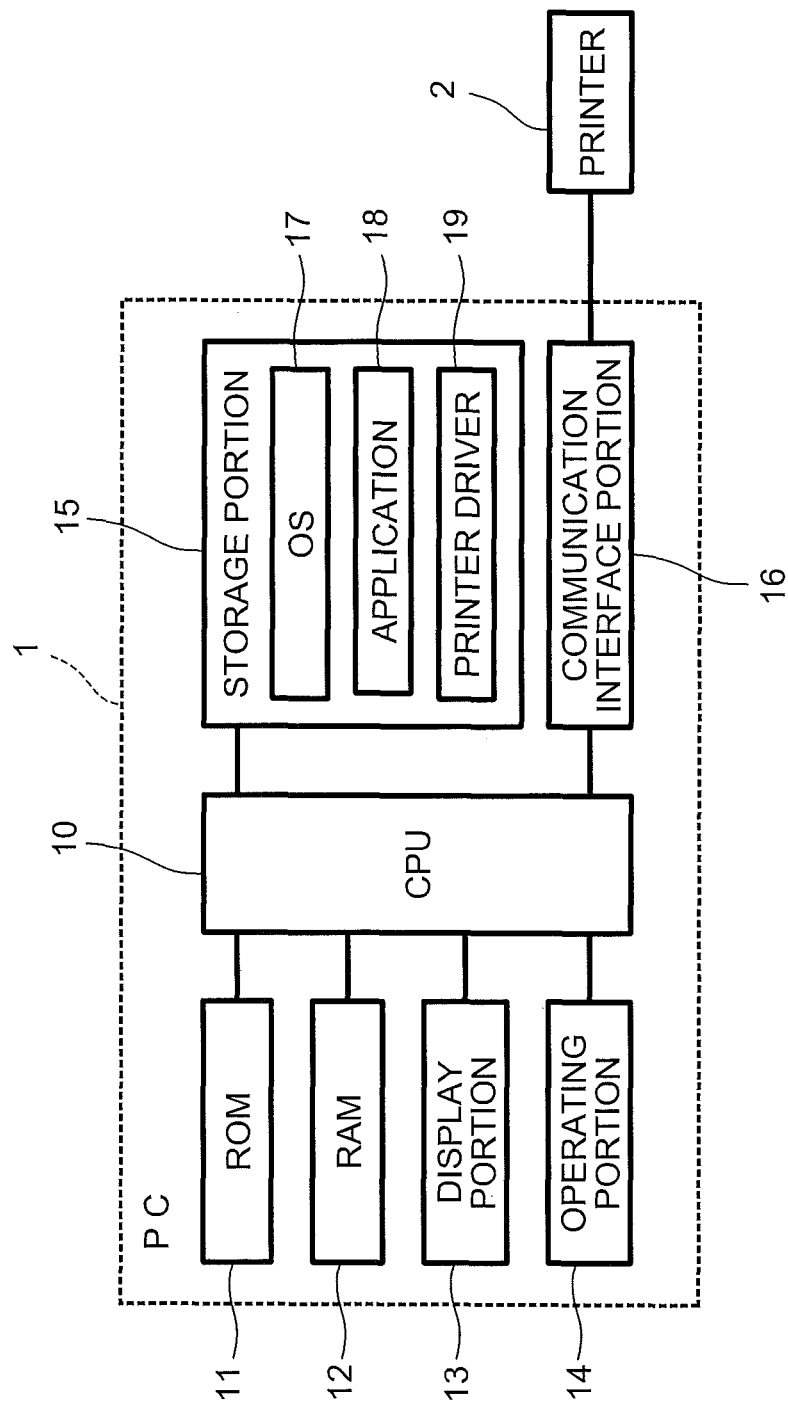
FIG. 1 is a block diagram depicting an electrical configuration of a personal computer in a first illustrative embodiment according to one or more aspects of the disclosure.

As depicted in FIG. 1, a personal computer ("PC") 1, which is an example of an information processing device, comprises a central processing unit ("CPU") 10, a read-only memory ("ROM") 11, a random-access memory ("RAM") 12, a display portion 13, an operating portion 14, a storage portion 15, and a communication interface portion 16.

In one aspect, CPU 10 is configured to control functions of each portion of the PC 1 by executing programs stored in the ROM 11 or the storage portion 15. In one aspect, ROM 11 is configured to store the programs to be executed by the CPU 10 and various data, the RAM 12 is configured to be used as a main storage when the CPU 10 performs various processing, the RAM 12 is an example of a memory and the CPU 10 is an example of a processor.

In one aspect, the display portion 13 comprises a display unit and a display-unit driving circuit, the display unit comprises, for example, a liquid crystal display, and the display-unit driving circuit is configured to drive the display unit.

The operating portion 14 comprises, for example, a keyboard, a mouse, and interfaces to which the keyboard and the mouse can be connected.

The storage portion 15 comprises a nonvolatile memory, for example, a hard disk or a flash memory, and can be configured to store various programs and data therein. The storage portion 15 is configured to store an operating system ("OS") 17, an application program (hereinafter, simply referred to as "application") 18, and a printer driver program (hereinafter, simply referred to as "printer driver") 19 for controlling functions of a printer 2. The application 18 comprises any program that has a function of outputting data of a print target to the OS 17, for example, a word processor or a spreadsheet program. The printer driver 19 is an example of a page-layout program.

The communication interface portion 16 is configured to be connected to the printer 2 to allow the PC 1 to communicate with the printer 2 via a wired communication network, for example, a local-area network ("LAN"), a wireless communication network, a Universal Serial Bus ("USB"), or a parallel line. The communication interface portion 16 is further configured to send print data to the printer 2. The print data is an example of output data.

The printer 2 is configured to print an image represented by the print data received from the PC 1 onto a printing sheet. The printing sheet is an example of a sheet. In the first illustrative embodiment, the printer 2 is an electrophotographic printer that is configured to perform printing by using toner. Nevertheless, in other embodiments, for example, the printer 2 may be an inkjet printer configured to perform printing by using ink. The toner and the ink are an example of a colorant.

Figure 2:
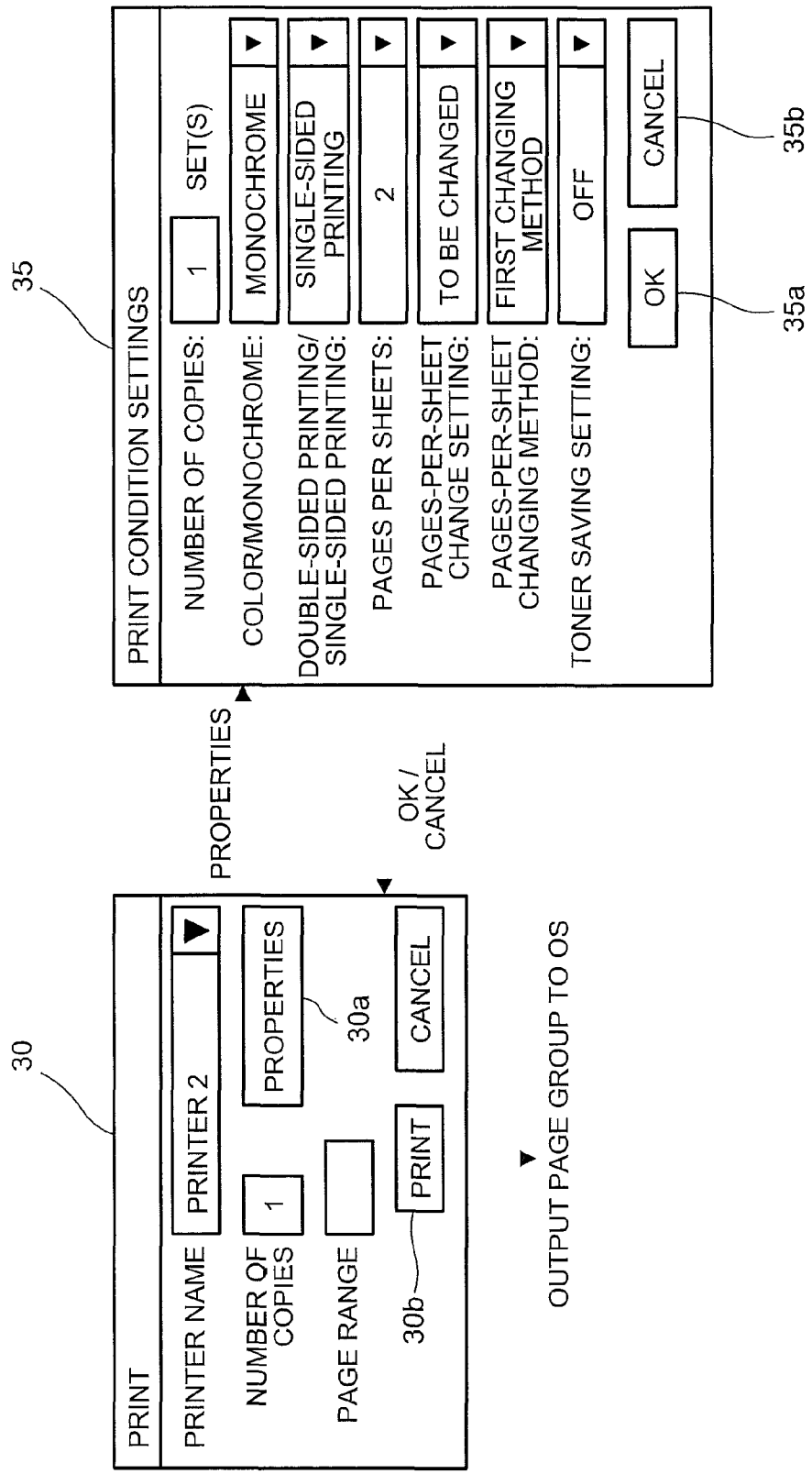
FIG. 2 is a schematic diagram depicting a print screen and a print condition setting screen in the first illustrative embodiment according to one or more aspects of the disclosure.

As depicted in FIG. 2, a print screen 30 is displayed by the application 18, and a print condition setting screen 35 is displayed by the printer driver 19. A user can call up a printer driver for controlling a currently-selected printer by clicking a "properties" button 30a on the print screen 30. In the first illustrative embodiment, it is assumed that the "properties" button 30a is clicked while the printer 2 is specified.

In one aspect, the printer driver 19 called by the application 18 is configured to display the print condition setting screen 35 on the display portion 13 for allowing the user to specify one or more print conditions. The print condition setting screen 35 comprises various print setting items, for example, "number of copies", "color/monochrome", "double-sided printing/single-sided printing", "pages per sheet", "pages-per-sheet change setting" "pages-per-sheet changing method", and "toner saving setting".

The number of pages per sheet is now described with reference to FIG. 3. The number of pages per sheet refers to the number of pages laid out on one side of a printing sheet. In the first illustrative embodiment, one of values 1, 2, 4, 9, and 16 is available to be specified as the number of pages per sheet. The user specifies a desired value from the values 1, 2, 4, 9, and 16 in the print setting item "pages per sheet". A default value of the number of pages per sheet may be 1. Hereinafter, when the value 2 or greater is specified in the print setting item "pages per sheet", N-in-1 printing is performed.

Figure 3:
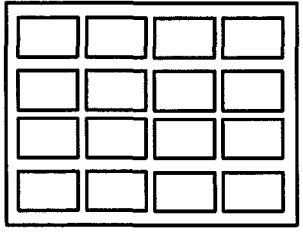
FIG. 3 is a schematic diagram for explaining the number of pages per sheet in the first illustrative embodiment according to one or more aspects of the disclosure.

As depicted in FIG. 3, when the value 2 is specified in the print setting item "pages per sheet", pages to be printed are laid out on a landscape-oriented printing sheet. When one of the values 1, 4, 9, and 16 is specified in the print setting item "pages per sheet", pages to be printed are laid out on a portrait-oriented printing sheet.

In one aspect, a page may refer to data to be printed on one side of a printing sheet when the value "1" is specified in the print setting item "pages per sheet". A plurality of pages outputted from the application 18 is an example of a page group With reference to FIG. 2, the print setting items are described in detail. The print setting item "pages-per-sheet change setting" specifies whether the number of pages per sheet is changed when the total number of pages included in a page group to be printed is changed by an instruction to delete one or more pages from a preview screen 40 (see FIG. 4). The print setting item "pages-per-sheet change setting" is further descried below. The print setting item "pages-per-sheet change setting" comprises options of "To be changed" and "Not to be changed", one of which may be selectively specified therein.

Figure 4:
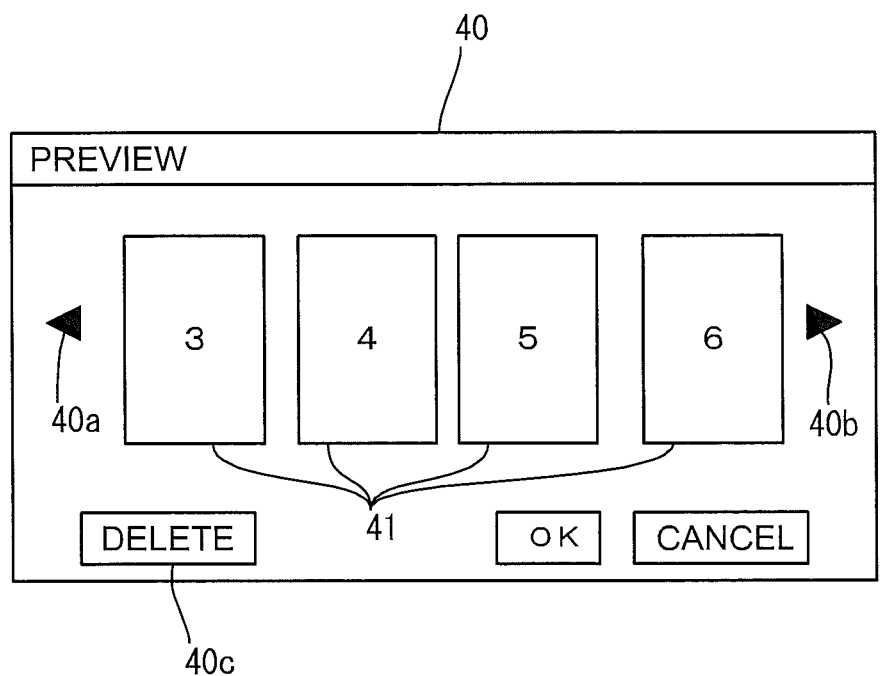
FIG. 4 is a schematic diagram depicting an example of a preview screen in the first illustrative embodiment according to one or more aspects of the disclosure.

The print setting item "pages-per-sheet changing method" specifies a method for changing the number of pages per sheet when the total number of pages included in the page group to be printed is changed in response to the instruction to delete one or more pages issued on the preview screen 40 (see FIG. 4). The print setting item "pages-per-sheet changing method" is further described below. The print setting item "pages-per-sheet changing method" comprises options of a "first changing method" and a "second changing method", one of which may be selectively specified therein.

The print setting item "toner saving setting" specifies whether a toner consumption in printing of the pages included in the page group needs to be saved. The print setting item "toner saving setting" comprises options of "on" and "off", one of which may be selectively specified therein. When the option "on" is specified in the print setting item "toner saving setting", a size of each dot to be formed on a printing sheet is reduced in printing or the number of dots for each pixel of image data is reduced in printing. Therefore, the printing is performed with saving toner.

When the user clicks one of an "OK" button 35a and a "cancel" button 35b on the print condition setting screen 35, the print screen 30 appears. When the "OK" button 35a is clicked, the printer driver 19 is configured to display the print screen 30 after setting one or more newly-specified values, which have been changed from their default values by the user on the print condition setting screen 35, to the corresponding print setting items, as print conditions. When the "cancel" button 35b is clicked, the printer driver 19 is configured to display the print screen 30 after setting the default values to the print setting items, as the print conditions.

As the user clicks a "print" button 30b on the print screen 30, print target data may be outputted by page from the application 18 to the printer driver 19 via the OS 17.

In the first illustrative embodiment, a page refers to data to be printed on one side of a printing sheet when the value "1" is specified in the print setting item "pages per sheet".

Processing for accepting a setting of the print conditions by displaying the print condition setting screen 35 is an example of pages-per-sheet setting processing, layout-method selecting processing, one-sided printing/double-sided printing selecting processing, economy setting processing. The processing in which the printer driver 19 receives a page group from the application 18 is an example of receiving processing. The single-sided printing is an example of a single-sided layout. The double-sided printing is an example of a double-sided layout.

The preview screen 40 displayed by the printer driver 19 is now described with reference to FIG. 4. When the printer driver 19 receives the above-described page group from the application 18, the printer driver 19 is configured to temporarily store the page group in the RAM 12 and then generate an image for preview on a page basis. Hereinafter, an image for preview is simply referred to as a preview image.

After that, the printer driver 19 is configured to display a preview screen 40 on the display portion 13 with one or more preview images 41 displayed on the preview screen 40. In FIG. 4, the preview images 41 are arranged in a row in order from left to right. The user scrolls the preview images 41 currently displayed on the preview screen 40 by using scroll arrows 40a and 40b.

The user checks the contents of the pages to be printed by viewing the preview images 41. When the user finds one or more pages for which printing is not necessary, the user can delete the one or more unnecessary pages from the preview screen 40. More specifically, the user can select one or more preview images 41 corresponding to one or more unnecessary pages and then click a "delete" button 40c to delete the one or more unnecessary pages corresponding to the one or more selected preview images 41. Upon receipt of the page delete instruction, the printer driver 19 is configured to delete the one or more preview images 41 corresponding to the one or more unnecessary pages from the preview screen 40 and erase the data of the pages of the one or more deleted preview images 41 from the RAM 12.

That is, the user can change the total number of pages included in the page group to be printed by providing the page delete instruction through the preview screen 40 after specifying a desired value in the print setting item "pages per sheet" on the print condition setting screen 35.

The processing in which the printer driver 19 displays the preview screen 40 and erases one or more unnecessary pages corresponding to the selected preview images 41 from the RAM 12 is an example of total-page-number changing processing.

When the total number of pages included in the page group to be printed is changed in response to the page delete instruction issued through the preview screen 40 while the N-in-1 printing has been specified, the printer driver 19 is configured to change the current value that has been specified in the print setting item "pages per sheet" by the user on the print condition setting screen 35 to another value.

The method for changing the number of pages per sheet comprises a first changing method and a second changing method. The first and second changing methods are described below. Hereinafter, the value specified in the print setting item "pages per sheet" by the user on the print condition setting screen 35 is also referred to as an originally-specified value of the number of pages per sheet.

Figure 5:
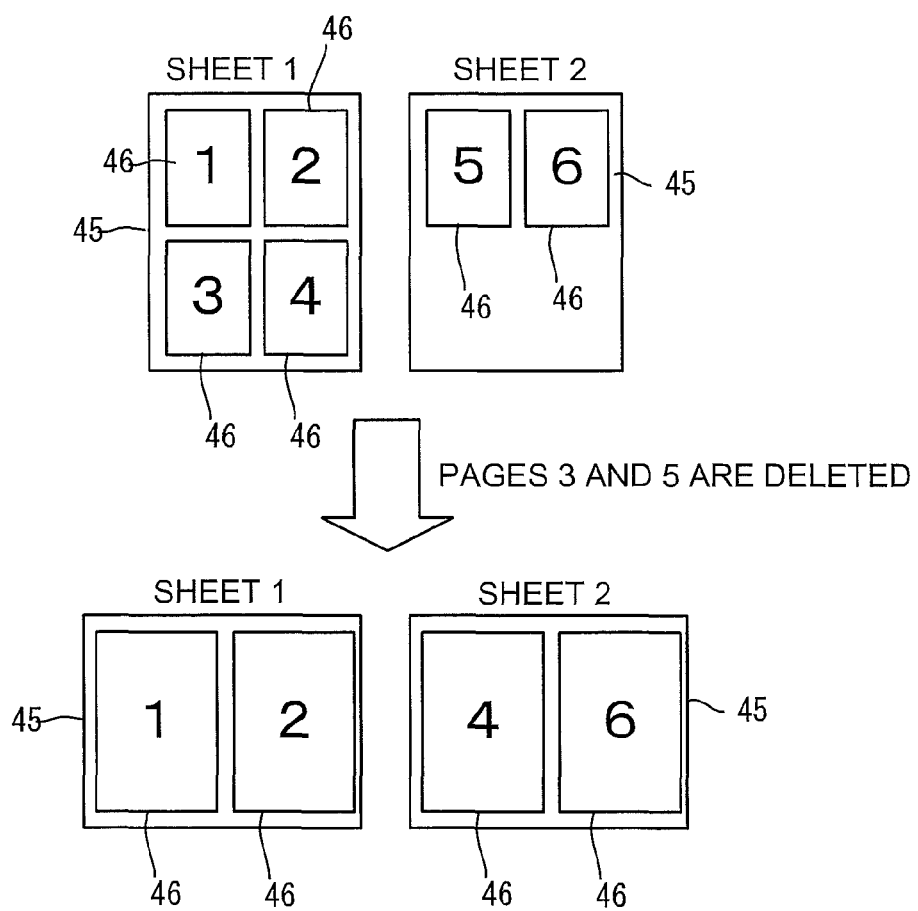
FIG. 5 is a schematic diagram illustrating a first changing method when single-sided printing is specified in the first illustrative embodiment according to one or more aspects of the disclosure.
Figure 6:
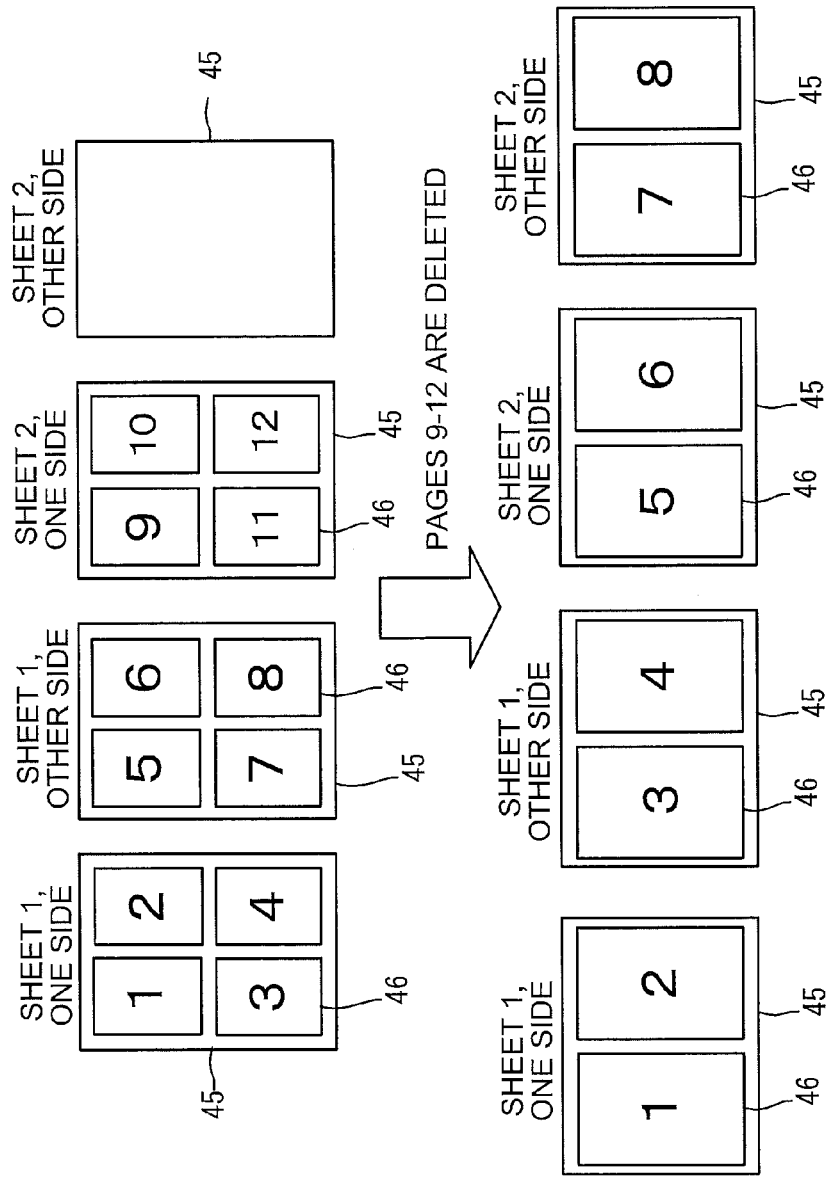
FIG. 6 is a diagram illustrating the first changing method when double-sided printing is specified in the first illustrative embodiment according to one or more aspects of the disclosure.

With reference to FIGS. 5 and 6, the first changing method is now described. In the first changing method, the printer driver 19 is configured to change an originally-specified value of the number of pages per sheet to another value (e.g., a newly-specified value) that is smaller than the originally-specified value. Accordingly, in the print group in which pages have been deleted, the remaining pages are laid out by using the newly-specified value. This value may not exceed the number of printing sheets to be used when the pages included in the page group from which no page has been deleted are laid out by using the originally-specified value of the number of pages per sheet.

Slightly different changing methods may be adopted for a case where the single-sided printing has been specified and a case where the double-sided printing has been specified, respectively. Therefore, the first changing method is described below with respect to each case.

With reference to FIG. 5, the first changing method that is performed when the single-sided printing has been specified is described below. In FIG. 5, an outer rectangle may represent an image receiving side 45 of a printing sheet and an inner rectangle may represent a page 46. The image receiving side 45 refers to a side on which one or more pages 46 is laid out for printing. In the single-sided printing, the number of image receiving sides 45 is equal to the number of printing sheets to be used. In the double-sided printing, each side of a printing sheet corresponds to the image receiving side 45.

When the single-sided printing has been specified, the printer driver 19 is configured to change the originally-specified value of the number of pages per sheet to one of the values N that may satisfy Expression 1 below and be smaller than the originally-specified value.

The number of pages per sheet $N \geq LPn/PPn1$   Expression 1:

In this embodiment, "LPn" represents the total number of pages included in the page group from which one or more pages 46 have been deleted.

In this embodiment, "PPn1" represents the number of image receiving sides to be used when the pages included in the page group from which no page 46 has been deleted are laid out by using the originally-specified value of the number of pages per sheet.

In this embodiment, "LPn/PPn1" represents the number of pages per image receiving side when the pages included in the page group from which one or more pages 46 have been deleted are laid out on the image receiving sides 45 that are equal in number to the number of image receiving sides to be used when the pages included in the page group from which no page 46 has been deleted are laid out by using the originally-specified value of the number of pages per sheet.

In the example depicted in FIG. 5, it is assumed that a page group from which no page has been deleted includes six pages in total and an originally-specified value of the number of pages per sheet is "4". In this case, the number of image receiving sides to be used when the pages included in the page group (e.g., six pages in total) are laid out by using the originally-specified value "4" of the number of pages per sheet "PPn1" is "2". When two pages, e.g., pages 3 and 5, are deleted from the page group, the total number of pages remaining in the page group from which the one or more pages 46 (e.g., two pages) have been deleted "Lpn" is "4". Therefore, in the example depicted in FIG. 5, the number of pages per sheet N is greater than or equal to 2 (N≥2 (=4/2)).

When the originally-specified value of the number of pages per sheet was changed to another value that satisfies Expression 1, the number of image receiving sides to be used when the remaining pages included in the page group from which one or more pages 46 have been deleted are laid out by using the other value, i.e., a newly-specified value, may not exceed the number of image receiving sides to be used when the pages included in the page group from which no page 46 has been deleted are laid out by using the originally-specified value of the number of pages per sheet "PPn1".

In other words, the number of printing sheets to be used when the remaining pages included in the page group from which the one or more pages 46 has been deleted are laid out by using the newly-specified value of the number of pages per sheet does not exceed the number of printing sheets to be used when the pages included in the page group from which no page 46 has been deleted are laid out by using the originally-specified value of the number of pages per sheet.

As described above, in the first illustrative embodiment, the value that is specified in the number of pages per sheet is limited to 1, 2, 4, 9 and 16. Therefore, the value of the number of pages per sheet that satisfies the number of pages per sheet N≥2 is one of the values 2, 4, 9 and 16. In this case, the originally-specified value of the number of pages per sheet is "4". Therefore, a value that is specified and smaller than the originally-specified value "4" is "2". Thus, the printer driver 19 changes the originally-specified value of the number of pages per sheet to "2".

In the example depicted in FIG. 5, the value that specifies the number of pages per sheet is limited to 1, 2, 4, 9 and 16. Therefore, the value of the number of pages per sheet that satisfies the number of pages per sheet N≥2 and smaller than the originally-specified value "4" is "2" only. Nevertheless, in other embodiments, for example, there are a plurality of available values that may be smaller than the originally-specified value "4", for example, a value "3" may be specified in the number of pages per sheet, as a newly-specified value. The size of each page laid out on a printing sheet may become larger when a smaller value is specified in the number of pages per sheet. Thus, when there are a plurality of available values that may be smaller than the originally-specified value, the printer driver 19 changes the originally-specified value to the smallest value of the plurality of available values.

In other cases, the value of the number of pages per sheet that satisfy Expression 1 is one of the values 4, 9, and 16. For example, in the example depicted in FIG. 5, when one page 46 is deleted from the page group, the total number of pages remaining in the page group "LPn1" is five pages, and the number of pages per sheet is N≥2.5(=5/2). Therefore, the value of the number of pages per sheet that satisfies the number of pages per sheet N≥2.5 is one of values 4, 9, and 16. In this case, the value that is smaller than the originally-specified value "4" is not present in the values N of the number of pages per sheet that satisfy Expression 1. Thus, the originally-specified value "4" is used without being changed.

That is, in the first illustrative embodiment, the originally-specified value of the number of pages per sheet is changed only when one or more values that are smaller than the originally-specified value are present in the value N of the number of pages per sheet that satisfy Expression 1. The same condition may also be used in the other changing methods.

With reference to FIG. 6, the first changing method that is performed when the double-sided printing has been specified is now described. In FIG. 6, only one page laid out on each image receiving side 45 of a printing sheet is assigned the reference numeral 46. For the sake of brevity, the reference number 46 is omitted from the other pages. When the double-sided printing has been specified, the printer driver 19 determines the number of image receiving sides to be used "PPn1" on condition that one or more pages 46 are laid out on the other image-receiving side of the last printing sheet.

More specifically, in an example depicted in FIG. 6, it is assumed that a page group from which no page has been deleted includes 12 pages in total and an originally-specified value of the number of pages per sheet is "4". In this case, the number of image receiving sides to be used when the pages included in the page group (e.g., 12 pages in total) are laid out by using the originally-specified value "4" of the number of pages per sheet "PPn1" is "3". When four pages, e.g., pages 9-12, are deleted from the page group, the total number of pages remaining in the page group from which the one or more pages 46 (e.g., four pages) have been deleted "Lpn" is "8".

In the example depicted in FIG. 6, the number of image receiving sides to be used "PPn1" is "3" which is an odd number. When the double-sided printing has been specified and the value of "PPn1" is an odd number, the printer driver 19 may add 1 to the value of "PPn1". With this configuration, one or more pages are laid out on the other image-receiving side of the last printing sheet.

In this case, when 1 is added to the value of "PPn1", the value of "PPn1" becomes "4". Therefore, in the example depicted in FIG. 6, the number of pages per sheet is N≥2 (=8/4). The value that satisfies the number of pages per sheet N≥2 is one of the values 2, 4, 9, and 16. In this case, the originally-specified value of the number of pages per sheet was "4". Therefore, the value that is specified and that is smaller than the originally-specified value "4" is "2". Thus, the printer driver 19 changes the originally-specified value of the number of pages per sheet to "2".

Figure 7:
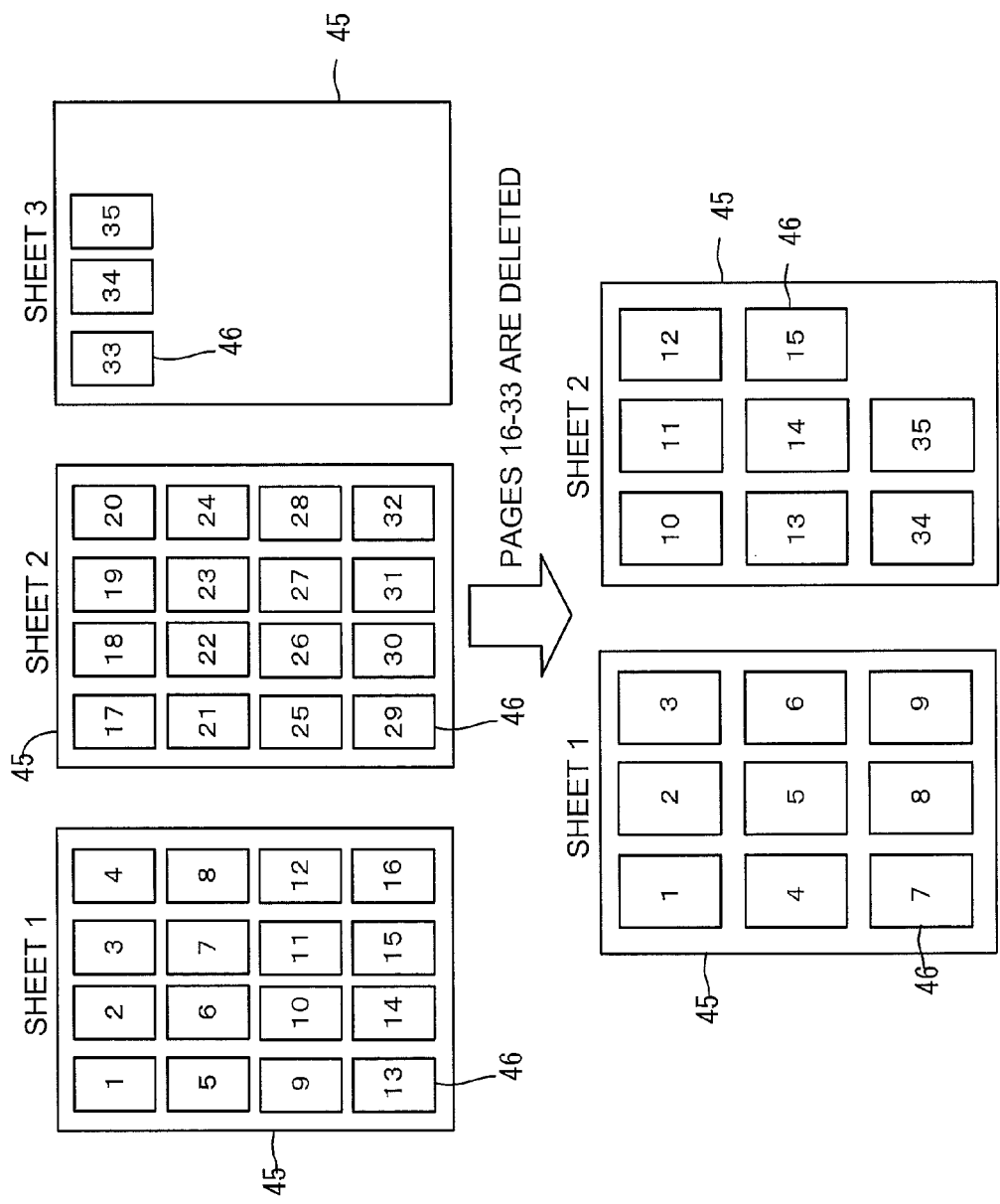
FIG. 7 is a diagram illustrating a second changing method when single-sided printing is specified in the first illustrative embodiment according to one or more aspects of the disclosure.

Next, with reference to FIG. 7, the second changing method is described. In the second changing method, the printer driver 19 is configured to change an originally-specified value of the number of pages per sheet to another value (e.g., a newly-specified value) that is smaller than the originally-specified value. Accordingly, in the print group in which pages have been deleted, the remaining pages are laid out by using the newly-specified value. This value does not exceed the number of printing sheets to be used when the pages remaining in the page group from which the one or more page have been deleted are laid out by using the originally-specified value of the number of pages per sheet.

In the second changing method, also, slightly different changing methods are adopted for a case where the single-sided printing has been specified and a case where the double-sided printing has been specified, respectively. Therefore, the second changing method is described with respect to each case.

With reference to FIG. 7, the second changing method that is performed when the single-sided printing has been specified is described below. When the single-sided printing has been specified, the printer driver 19 is configured to change the originally-specified value to the smallest value of N that satisfies Expression 2 below.

The number of pages per sheet $N \geq LPn/PPn2$      Expression 2:

In one aspect, "PPn2" represents the number of image receiving sides to be used when the pages remaining in the page group from which one or more pages 46 have been deleted are laid out by using the originally-specified value of the number of pages per sheet.

In an example depicted in FIG. 7, it is assumed that a page group from which no page has been deleted includes thirty-five (35) pages in total, an originally-specified value of the number of pages per sheet is sixteen (16), and eighteen (18) pages, e.g., pages 16-33, are deleted from the page group. In this case, the total number of pages remaining in the page group from which the one or more pages 46 (e.g., 18 pages) have been deleted, "LPn", is seventeen (17) pages, and the number of image receiving sides to be used when the pages (e.g., 17 pages in total) remaining in the page group from which the one or more pages 46 have been deleted are laid out by using the originally-specified value "16" of the number of pages per sheet, "PPn2", is "2". Therefore, the number of pages per sheet is N≥8.5 (=17/2).

The value that satisfies the number of pages per sheet N≥8.5 is one of the values 9 and 16. In this case, the originally-specified value of the number of pages per sheet is "16". Therefore, a value that is smaller than the originally-specified value is "9". Thus, the printer driver 19 changes the originally-specified value of the number of pages per sheet to "9".

Figure 8:
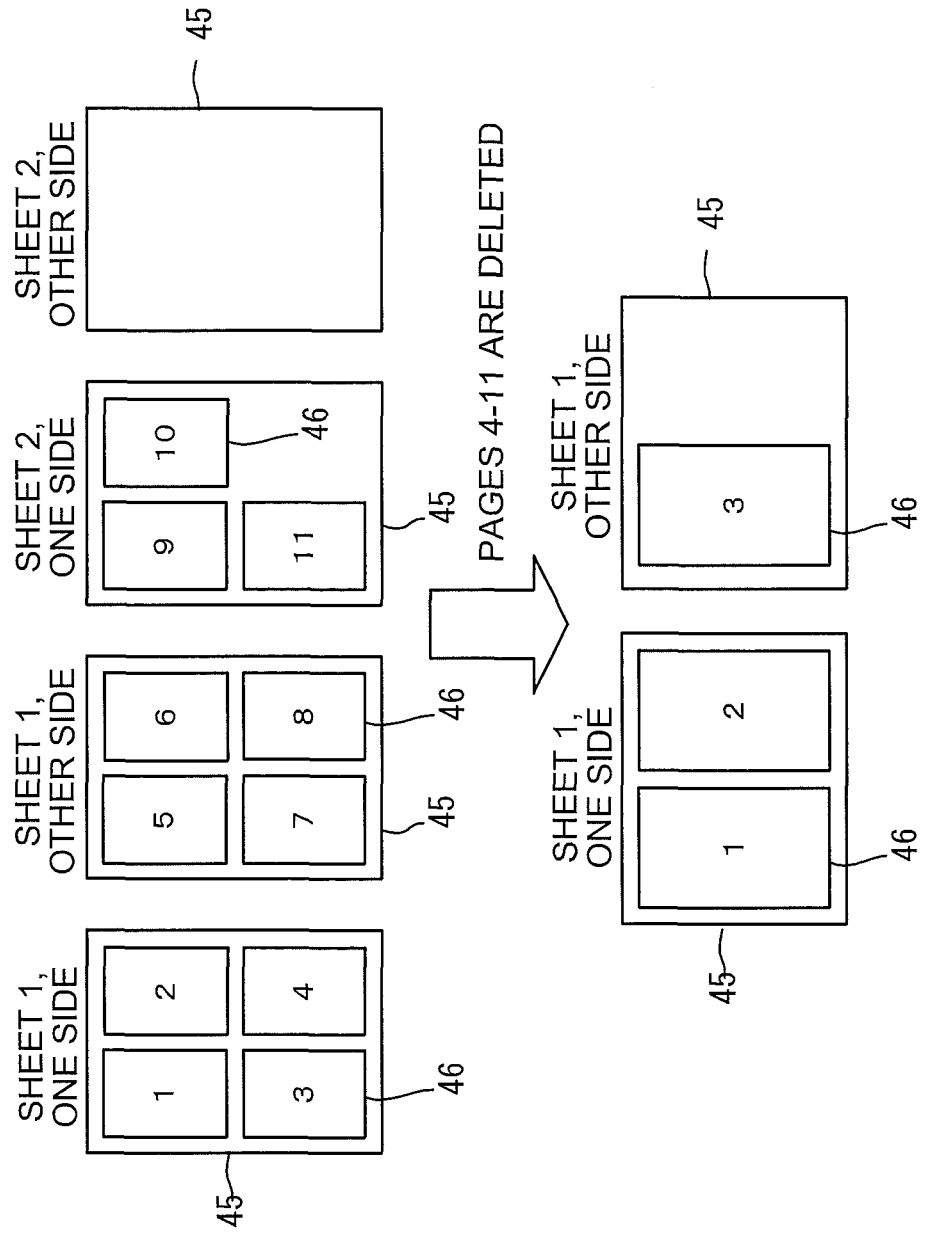
FIG. 8 is a schematic diagram illustrating the second changing method when double-sided printing is specified in the first illustrative embodiment according to one or more aspects of the disclosure.

With reference to FIG. 8, the second changing method that is performed when the double-sided printing has been specified is now described. When the double-sided printing has been specified, the printer driver 19 determines the number of image receiving sides to be used, "PPn2", on condition that one or more pages 46 are laid on the other imagereceiving side of the last printing sheet.

More specifically, in an example depicted in FIG. 8, it is assumed that a page group from which no page has been deleted includes 11 pages in total, an originally-specified value of the number of pages per sheet is "4", and eight pages, e.g., pages 4-11, are deleted from the page group. In this case, the total number of pages remaining in the page group from which the one or more pages 46 (e.g., eight pages) have been deleted, "LPn", is "3", and the number of image receiving sides to be used when the pages (e.g., three pages in total) remaining in the page group from which the one or more pages 46 have been deleted are laid out by using the originally-specified value "4" of the number of pages per sheet, "PPn2", is "1".

In the example depicted in FIG. 8, the number of image receiving sides to be used, "PPn2", is "1" which is an odd number. When the value of "PPn2" is an odd number, the printer driver 19 adds 1 to the value of "PPn2". In this case, when 1 is added to the value of "PPn2", the value of "PPn2" becomes "2". Therefore, in the example depicted in FIG. 8, the number of pages per sheet is N≥1.5 (=3/2). The value that satisfies the number of pages per sheet N≥1.5 is one of the values 2, 4, 9, and 16. In this case, the originally-specified value of the number of pages per sheet is "4". Therefore, the value that is smaller than the originally-specified value "4" is "2". Thus, the printer driver 19 changes the originally-specified value of the number of pages per sheet to "2".

As described above, when one or more pages are deleted from a page group, the printer driver 19 changes the originally-specified value of the number of pages per sheet to another value that is smaller than the originally-specified value. Nevertheless, there may be some exceptions as described below. Hereinafter, examples are described as to cases where the number of pages per sheet is not changed although one or more pages are deleted from a page group.

Figure 9:
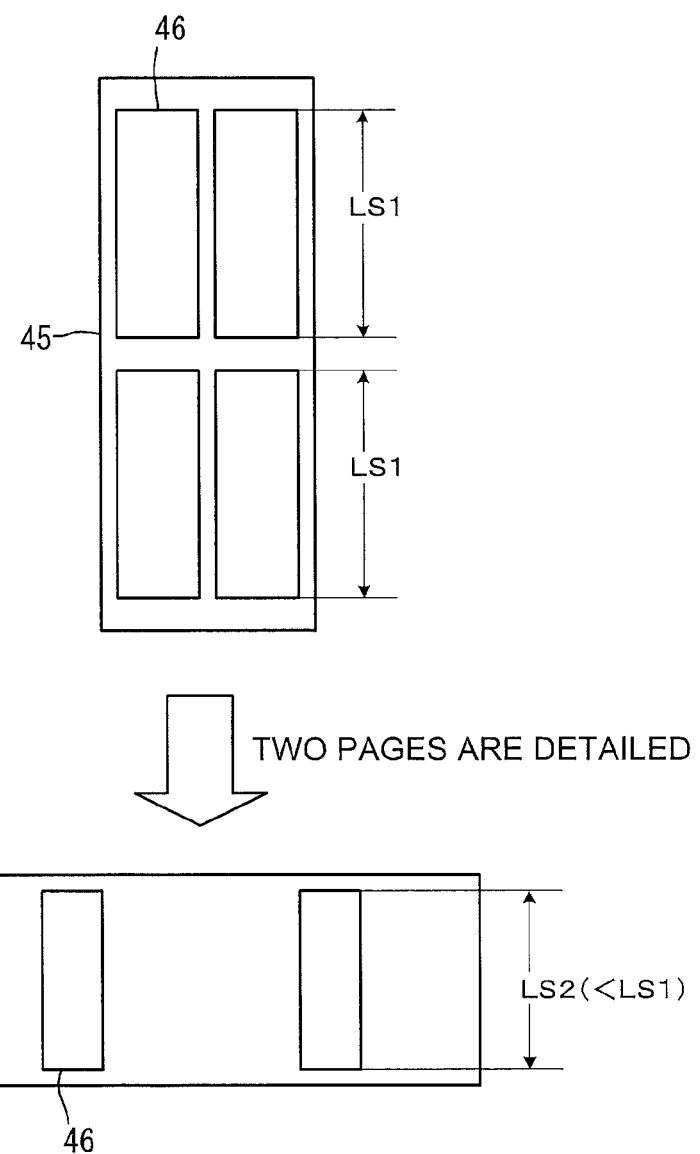
FIG. 9 is a diagram illustrating a case where the number of pages per sheet is not changed although the total number of pages in a page group is changed in the first illustrative embodiment according to one or more aspects of the disclosure.

With reference to FIG. 9, one example of the exceptions is described. In this example, it is assumed that a page group from which no page has been deleted includes 4 pages in total, an originally-specified value of the number of pages per sheet is "4", and two pages are deleted from the page group. When the originally-specified value of the number of pages per sheet is changed in accordance with the first changing method, the number of pages per sheet is N≥2 (=2/1). Therefore, the newly-specified value of the number of pages per sheet is "2".

As described above, the printer driver 19 is configured to lay out the pages on one or more landscape-oriented printing sheets when the value "2" is specified in the number of pages per sheet. It is assumed that a height of a landscape-oriented sheet is half of a height of a portrait-oriented printing sheet. In this case, when the originally-specified value of the number of pages per sheet is changed from "4" to "2", a height of each page laid out by using the originally-specified value (i.e., the value "4") "LS1" is substantially half of the height of the portrait-oriented printing sheet. However, a height of each page laid out by using the newly-specified value (i.e., the value "2") "LS2" is shorter than a half of the height of the portrait-oriented printing sheet. That is, the size of each page laid out by using the newly-specified value of the number of pages per sheet becomes smaller than the size of each page laid out by using the originally-specified value of the number of pages per sheet.

In some cases, depending on upper, lower, right, and left margins, a height of an area in the landscape-oriented printing sheet from which the upper, lower, right, and left margins are omitted is less than a half of a height of an area in the portrait-oriented printing sheet from which the upper, lower, right, and left margins are omitted. In this case, also, when the originally-specified value of the number of pages per sheet is changed from "4" to "2", the size of each page laid out by using the newly-specified value of the number of pages per sheet becomes smaller than the size of each page laid out by using the originally-specified value of the number of pages per sheet.

The size reduction of each page makes it difficult for the user to confirm the contents of each page. Therefore, when the size of each page laid out by using the newly-specified value of the number of pages per sheet becomes smaller than the size of each page laid out by using the originally-specified value of the number of pages per sheet, the printer driver 19 is configured not to change the originally-specified value of the number of pages per sheet although one or more pages 46 are deleted from the page group.

When pages are laid out by using the newly-specified value of the number of pages per sheet, an amount of toner to be used for printing is increased as compared with the amount of toner to be used for printing when the pages are laid out by using the originally-specified value of the number of pages per sheet. For example, in the example depicted in FIG. 5, when the pages are laid out by using the newly-specified value of the number of pages per sheet, the amount of toner to be used for printing is increased because a printing area of each page is expanded.

When the option "on" is specified in the print setting item "toner saving setting", increasing the amount of toner to be used for printing is undesirable. Therefore, when the option "on" has been specified in the print setting item "toner saving setting", the printer driver 19 is configured not to change the originally-specified value of the number of pages per sheet to another value although one or more pages are deleted from the page group.

As described above, one of the options of "To be changed" and "Not to be changed" is specified in the print setting item "pages-per-sheet change setting" on the print condition setting screen 35. When the option "Not to be changed" is specified in the print setting item "pages-per-sheet change setting", the printer driver 19 is configured not to change the originally-specified value of the number of pages per sheet although one or more pages are deleted from the page group.

Figure 10:
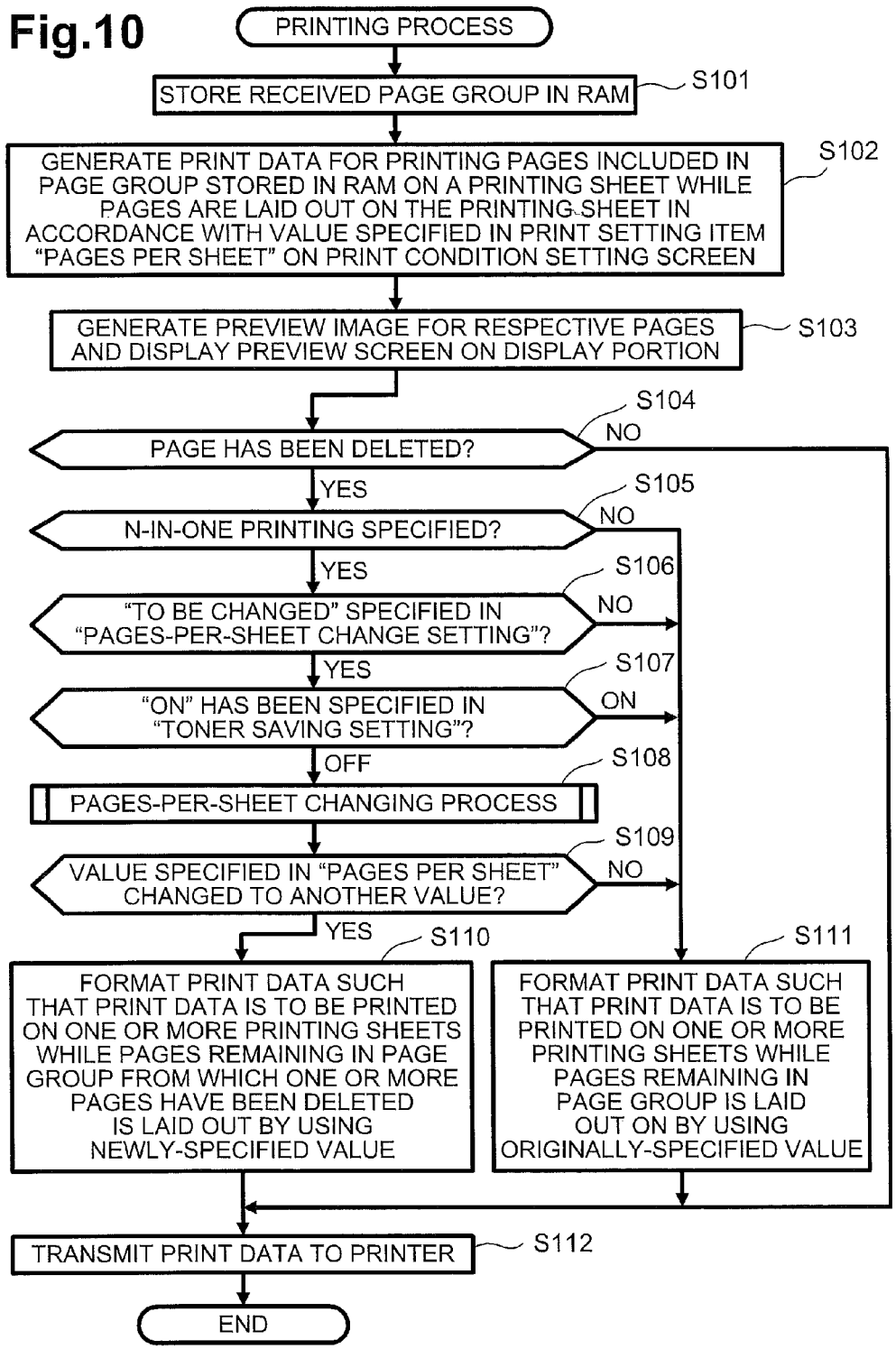
FIG. 10 is a flowchart depicting a printing process in the first illustrative embodiment according to one or more aspects of the disclosure.

A printing process is now described with reference to FIG. 10. The printing process starts as the application 18 outputs a page group to the printer driver 19.

At step S101, the CPU 10 that runs the printer driver 19 (hereinafter, simply referred to as the printer driver 19) stores the page group received from the application 18 in the RAM 12.

At step S102, the printer driver 19 generates print data for printing pages included in the page group stored in the RAM 12 on one or more printing sheets while the pages are laid out on each of the one or more printing sheets in accordance with an originally-specified value specified in the print setting item "pages per sheet" on the print condition setting screen 35.

A data format of the print data is, for example, Enhanced Metafile format ("EMF") or a format described in a page description language specific to the printer 2.

In the first illustrative embodiment, the data format of the print data is EMF. The print data in EMF comprises data representing each page, and layout information defining a location of each page to be laid out on a printing sheet. The print data in EMF permits its contents to be formatted later.

In this embodiment, the printer driver 19 is configured to generate image data representing a printing sheet, wherein the pages included in the page group are laid out on an imaginary printing sheet stored in the RAM 12 and handle the generated image data as print data. In other cases, the printer driver 19 is configured to perform a color space conversion or a binarization on the generated image data to obtain halftone image data and to handle the halftone image data as print data.

At step S103, the printer driver 19 is configured to generate preview images 41 for the respective pages stored in the RAM 12 and display a preview screen 40 on the display portion 13 while displaying the preview images 41 on the preview screen 40.

As described above, the user selects a preview image 41 representing an unnecessary page from the generated preview images 41 and provides an instruction to delete the selected preview image 41 on the preview screen 40. As the printer driver 19 receives the page delete instruction, the printer driver 19 deletes a page corresponding to the selected preview image 41. At this point, the user is allowed to select a plurality of preview images 41 and provide an instruction to delete the plurality of selected preview images 41. When the printer driver 19 receives the page delete instruction to delete the plurality of preview images 41, the printer driver 19 deletes a plurality of pages corresponding to the selected preview images 41 at once.

At step S104, the printer driver 19 determines whether at least one of the pages in the page group has been deleted at step S103. When at least one of the pages in the page group has been deleted (YES at step S104), the routine moves to step S105. When none of the pages included in the page group has been deleted (NO at step S104), the routine moves to step S112. The processing of step S104 is an example of determining processing.

At step S105, the printer driver 19 determines whether N-in-1 printing has been specified. When the N-in-1 printing has been specified (YES at step S105), the routine moves to step S106. When the N-in-1 printing has not been specified (NO at step S105), the routine moves to step S111.

At step S106, the printer driver 19 determines whether the option "To be changed" has been specified in the print setting item "pages-per-sheet change setting". When the option "To be changed" has been specified (YES at step S106), the routine moves to step S107. When the option "Not to be changed" has been specified (NO at step S106), the routine moves to step S111.

At step S107, the printer driver 19 determines whether the option "on" has been specified in the print setting item "toner saving setting". When the option "off" has been specified" (NO at step S107), the routine moves to step S108. When the option "on" has been specified (YES at step S107), the routine moves to step S111.

At step S108, the printer driver 19 performs the pages-per-sheet changing process. In the pages-per-sheet changing process, the originally-specified value specified in the print setting item "pages per sheet" is changed by using one of the first changing method and the second changing method. The pages-per-sheet changing process is further described below.

At step S109, the printer driver 19 determines whether the originally-specified value specified in the print setting item "pages per sheet" has been changed to another value at step S108. As a result of the determination of step S108, when the currently-specified value is the same as the originally-specified value specified by the user on the print condition setting screen 35, the printer driver 19 determines that the originally-specified value has not been changed. When the originally-specified value has been changed to another value (YES at step S109), the routine moves to step S110. When the originally-specified value has not been changed to another value (NO at step S110), the routine moves to step S111.

At step S110, the printer driver 19 formats the print data generated at step S102 such that the print data is to be printed on one or more printing sheets and the pages remaining in the page group from which the one or more pages have been deleted are laid out on each printing sheet by using the newly-specified value specified in the print setting item "pages per sheet".

At step S111, the printer driver 19 formats the print data generated at step S102 such that the print data is to be printed on one or more printing sheets and the pages remaining in the pages group are laid out on each printing sheet by using the originally-specified value specified in the print setting item "pages per sheet" by the user on the print condition setting screen 35.

At step S112, the printer driver 19 transmits the print data to the printer 2 after converting the print data into a format interpretable by the printer 2.

The processing of steps S102, S110, and S111 is an example of generating processing.

Figure 11:
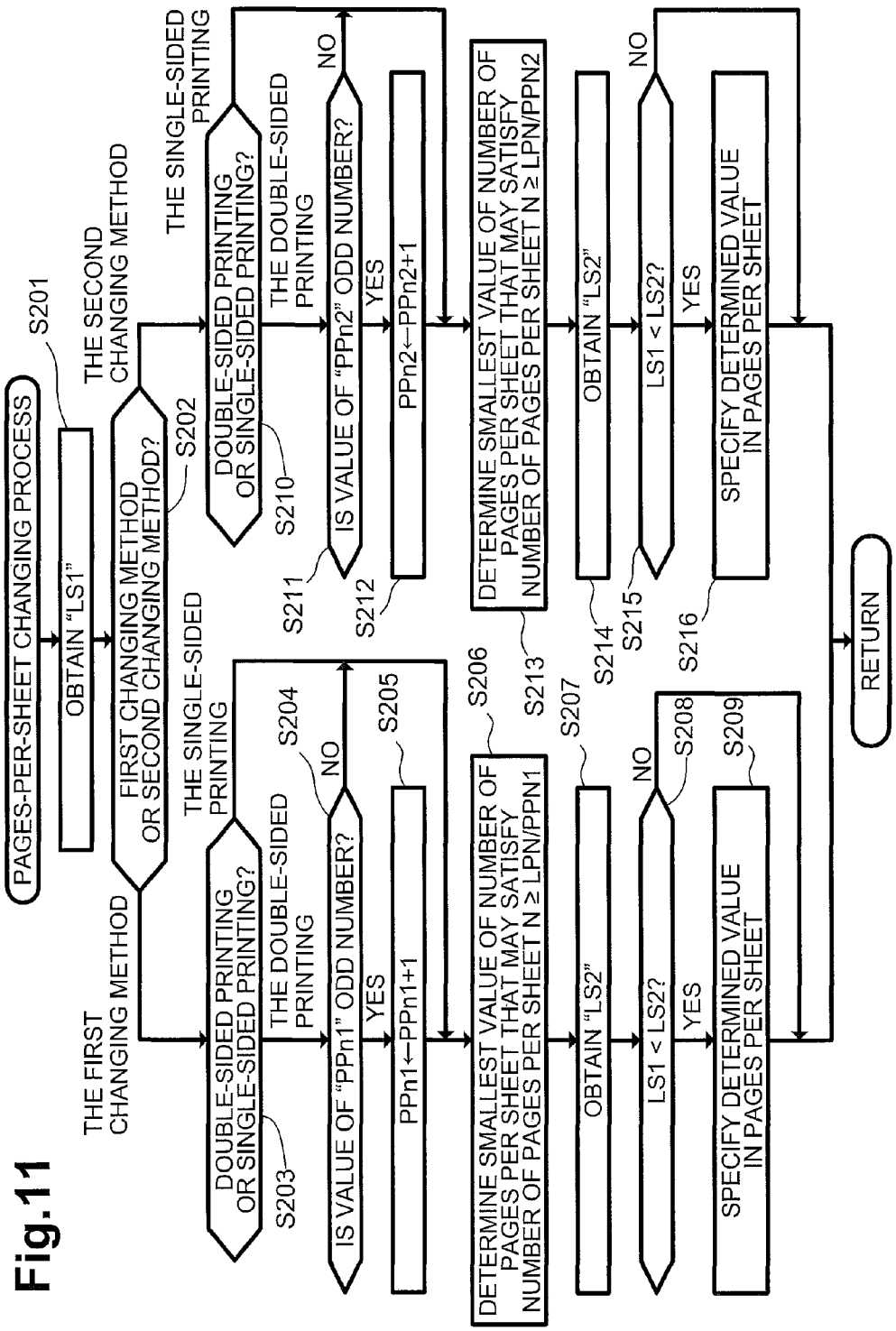
FIG. 11 is a flowchart depicting a pages-per-sheet changing process in the first illustrative embodiment according to one or more aspects of the disclosure.

With reference to FIG. 11, the pages-per-sheet changing process of step S108 is now described.

At step S201, the printer driver 19 obtains the page height "LS1" of each page that is included in the page group from which no page has been deleted and laid out on one or more printing sheets by using the originally-specified value (see FIG. 9).

At step S202, the printer driver 19 determines which one of the first changing method and the second changing method has been specified. When the first changing method has been specified, the routine moves to step S203. When the second changing method has been specified, the routine moves to step S210.

The processing of steps S203-S209 is performed when the first changing method has been specified.

At step S203, the printer driver 19 determines which one of the double-sided printing and the single-sided printing has been specified. When the double-sided printing has been specified, the routine moves to step S204. When the single-sided printing has been specified, the routine moves to step S206.

At step S204, the printer driver 19 determines whether the value of "PPn1" (i.e., the number of image receiving sides to be used when the pages included in the page group from which no page has been deleted are laid out by using the originally-specified value of the number of pages per sheet) is an odd number. When the value of "PPn1" is an odd number (YES at step S204), the routine moves to step S205. When the value of "PPn1" is an even number (NO at step S204), the routine moves to step S206.

At step S205, the printer driver 19 adds 1 to the value of "PPn1".

At step S206, the printer driver 19 determines the smallest value of the number of pages per sheet that satisfies Expression 1.

At step S207, the printer driver 19 obtains the page height "LS2" of each page that remains in the page group from which the one or more pages have been deleted and is laid out on one or more printing sheets by using the value of the number of pages per sheet specified at step S206 (see FIG. 9).

At step S208, the printer driver 19 determines whether a relationship between the page height "LS1" and the page height "LS2" satisfies a relationship of LS1<LS2. When the relationship between the page height "LS1" and the page height "LS2" satisfies the relationship of LS1<LS2 (YES at step S108), the routine may move to step S209. When the relationship between the page height "LS1" and the page height "LS2" does not satisfy the relationship of LS1<LS2 (i.e., LS1≥LS2) (NO at step S108), the pages-per-sheet changing process is ended and the routine moves back to the printing process.

At step S209, the printer driver 19 changes the value of the number of pages per sheet from the originally-specified value to the value specified at step S206. Here, when the value specified at step S206 is different from the originally-specified value specified by the user on the print condition setting screen 35, the printer driver 19 changes the value of the number of pages per sheet from the originally-specified value to the value specified at step S206.

processing of steps S210-S216 is performed when the second changing method has been specified.

At step S210, the printer driver 19 determines which one of the double-sided printing and the single-sided printing has been specified. When the double-sided printing has been specified, the routine moves to step S211. When the single-sided printing has been specified, the routine moves to step S213.

At step S211, the printer driver 19 determines whether the value of "PPn2" (i.e., the number of image receiving sides to be used when the pages remaining in the page group from which the one or more pages have been deleted are laid out by using the originally-specified value of the number of pages per sheet) is an odd number. When the value of "PPn2" is an odd number (YES at step S211), the routine moves to step S212. When the value of "PPn2" is an even number (NO at step S211), the routine moves to step S213.

At step S212, the printer driver 19 adds 1 to the value of "PPn2".

At step S213, the printer driver 19 determines the smallest value of the number of pages per sheet that satisfies Expression 2.

At step S214, the printer driver 19 obtains the page height "LS2" of each page that remains in the page group from which the one or more pages have been deleted and is laid out on one or more printing sheets by using the value of the number of pages per sheet specified at step S213 (see FIG. 9).

At step S215, the printer driver 19 determines whether a relationship between the page height "LS1" and the page height "LS2" satisfies a relationship of LS1<LS2. When the relationship between the page height "LS1" and the page height "LS2" satisfies the relationship of LS1<LS2 (YES at step S215), the routine moves to step S216. When the relationship between the page height "LS1" and the page height "LS2" does not satisfy the relationship of LS1<LS2 (i.e., LS1≥LS2) (NO at step S215), the pages-per-sheet changing process is ended and the routine moves back to the printing process.

At step S216, the printer driver 19 changes the value of the number of pages per sheet from the originally-specified value to the value specified 5213. Here, when the value specified at step S213 is different from the originally-specified value specified by the user on the print condition setting screen 35, the printer driver 19 changes the value of the number of pages per sheet from the originally-specified value to the value specified at step S213.

According to the first illustrative embodiment, when the total number of pages in the page group is changed after the value of the number of pages per sheet was specified on the print condition setting screen 35, the printer driver 19 is configured to change the originally-specified value of the number of pages per sheet to another value.

For example, in the prior art, when the originally-specified value of the number of pages per sheet was not changed although the total number of pages in the page group was changed after the value of the number of pages per sheet had been specified by the user, wasted space may appear on a printing sheet when the pages are printed on one or more printing sheets. By contrast, according to the first illustrative embodiment, the printer driver 19 is configured to change the originally-specified value of the number of pages per sheet to another value when the total number of pages in the page group is changed after the value of the number of pages per sheet was specified by the user on the print condition setting screen 35. Therefore, printing is performed by fully using space of one or more printing sheets.

Further, when one or more pages are deleted from the page group after the value of the number of pages per sheet was specified by the user, the printer driver 19 is configured to change the originally-specified value of the number of pages per sheet to a smaller value. When the originally-specified value of the number of pages per sheet is changed to a smaller value, the size of each page included in the page group to be printed becomes larger on the preview screen 40. Therefore, the user may confirm the contents of the pages more easily. Thus, user's usability is improved.

Further, according to the first illustrative embodiment, when the size of each page that remains in the page group from which one or more pages have been deleted and is laid out on one or more printing sheets by using the newly-specified value of the number of pages becomes smaller than the size of each page that is included in the page group from which no page has been deleted and laid out on one or more printing sheets by using the originally-specified value, the printer driver 19 is configured not to change the originally-specified value of the number of pages per sheet although one or more pages are deleted from the page group. This configuration allows the user to confirm the contents of the pages without difficulty.

Further, according to the first illustrative embodiment, in the first changing method, the printer driver 19 is configured to change the originally-specified value of the number of pages per sheet to another value that is smaller than the originally-specified value such that the number of printing sheets to be used when pages remaining in a page group from which one or more pages have been deleted are laid out by using the other value (i.e., the newly-specified value) of the number of pages per sheet does not exceed the number of printing sheets to be used when the pages included in the page group from which no page has been deleted are laid out by using the originally-specified value of the number of pages per sheet. Therefore, printing is performed on the number of printing sheets allowed by the user, fully using the space of the printing sheets.

For example, in the example depicted in FIG. 5, the user specifies, on the print condition setting screen 35, that the pages (e.g., six pages in total) of the page group from which no page has been deleted are laid out on one or more printing sheets by using the originally-specified value "4" of the number of pages per sheet. Therefore, the pages are printed on two printing sheets. If the value of the number of pages per sheet remains "4" after two pages are deleted, only one printing sheet may be needed for printing the remaining pages. However, even when two printing sheets are used for the printing of the remaining pages, the number of printing sheets to be used does not exceed the number of printing sheets to be used specified by the user on the print condition setting screen 35. Therefore, after one or more pages are deleted, the originally-specified value of the number of pages per sheet is changed to another value, e.g., "2". By doing so, the size of each page remaining in the page group is increased by using two printing sheets. Thus, printing may be performed on the number of printing sheets allowed by the user, fully using the space of the printing sheets. The example depicted in FIG. 6 also provides the same effect.

Further, according to the first illustrative embodiment, in the second changing method, the printer driver 19 is configured to change an originally-specified value of the number of pages per sheet to another value that may be smaller than the originally-specified value such that the number of printing sheets to be used when pages remaining in a page group from which one or more pages have been deleted are laid out by using the other value (i.e., a newly-specified value) of the number of pages per sheet does not exceed the number of printing sheets to be used when the pages remaining in the page group from which the one or more page have been deleted are laid out by using the originally-specified value of the number of pages per sheet. Thus, printing may be performed on the number of printing sheets allowed by the user, fully using the space of the printing sheets.

In the example depicted in FIG. 7, it is assumed that the number of printing sheets to be used that is allowed by the user is "2" which is the number of printing sheets to be used when the pages remaining in the page group (e.g., 17 pages in total) from which one or more pages have been deleted are laid out by using the originally-specified value "16" of the number of pages per sheet. In the example depicted in FIG. 7, if the value of the number of pages per sheet remains "16" after one or more pages are deleted from the page group, two printing sheets are still needed for printing the pages remaining in the page group. However, in this case, only one page is laid out on one side of a second printing sheet. Therefore, wasted space may appear on the second printing sheet. Nevertheless, when the originally-specified value of the number of pages per sheet is changed to a smaller value, e.g., the value "9", the second printing sheet may be further effectively used. That is, the size of each page may be increased, and thus, printing may be performed on the number of printing sheets allowed by the user, fully using the space of the printing sheets. The example depicted in FIG. 8 also provides the same effect.

According to the first illustrative embodiment, the printer driver 19 is configured to allow the user to select one of the first changing method and the second changing method for changing the number of pages per sheet. Therefore, this configuration provides the user with flexibility.

According to the first illustrative embodiment, when the double-sided printing has been specified, the printer driver 19 is configured to change the originally-specified value of the number of pages per sheet to another value on condition that one or more pages are laid out on the other image-receiving side of the last printing sheet. Therefore, the other image-receiving side of the last printing sheet may be effectively used.

According to the first illustrative embodiment, when the option "on" has been specified in the print setting item "toner saving setting", the printer driver 19 is configured not to change the originally-specified value of the number of pages per sheet to another value although one or more pages are deleted from the page group. Therefore, the amount of toner to be used in printing is not increased as compared with an amount of toner to be used when pages are laid out by using the originally-specified value of the number of pages per sheet.

According to the first illustrative embodiment, the printer driver 19 is configured to display the preview images 41 and delete one or more pages that are required to be deleted by using one or more preview images 41 corresponding to the one or more unnecessary pages. Therefore, the printer driver 19 is configured to change the total number of pages included in the page group by itself. That is, the total number of pages included in the page group is changed without an external program for changing the total number of pages in the page group.

Next, a second illustrative embodiment is described with reference to FIG. 12.

In the first illustrative embodiment, when one or more pages are deleted after the value of the number of pages per sheet was specified on the print condition setting screen 35, another value that is smaller than the originally-specified value may be specified as the newly-specified value of the number of pages per sheet. Nevertheless, according to the second illustrative embodiment, for example, when one or more pages are added to the page group after the value of the number of pages per sheet was specified on the print condition setting screen 35, another value that is greater than the originally-specified value may be specified as the newly-specified value of the number of pages per sheet.

The changing of the originally-specified value of the number of pages per sheet according to the second illustrative embodiment is now described. For example, it is assumed that Chapter 1 includes pages 1-3, Chapter 2 includes page 4, and the user requires that Chapter 1 and Chapter 2 be printed on separated sheets.

In the second illustrative embodiment, a blank page is added on the preview screen 40. For example, it is assumed that the user inserted a blank page between page 3 and page 4.

In response to this, the printer driver 19 changes the originally-specified value of the number of pages per sheet to another value that is greater than the originally-specified value of the number of pages per sheet such that the number of printing sheets to be used when pages included in the page group to which one or more pages have been added are laid out by using the other value (i.e., a newly-specified value) of the number of pages per sheet is not less than the number of printing sheets to be used when the pages included in the page group to which no page has been added are laid out by using the originally-specified value of the number of pages per sheet.

Figure 12:
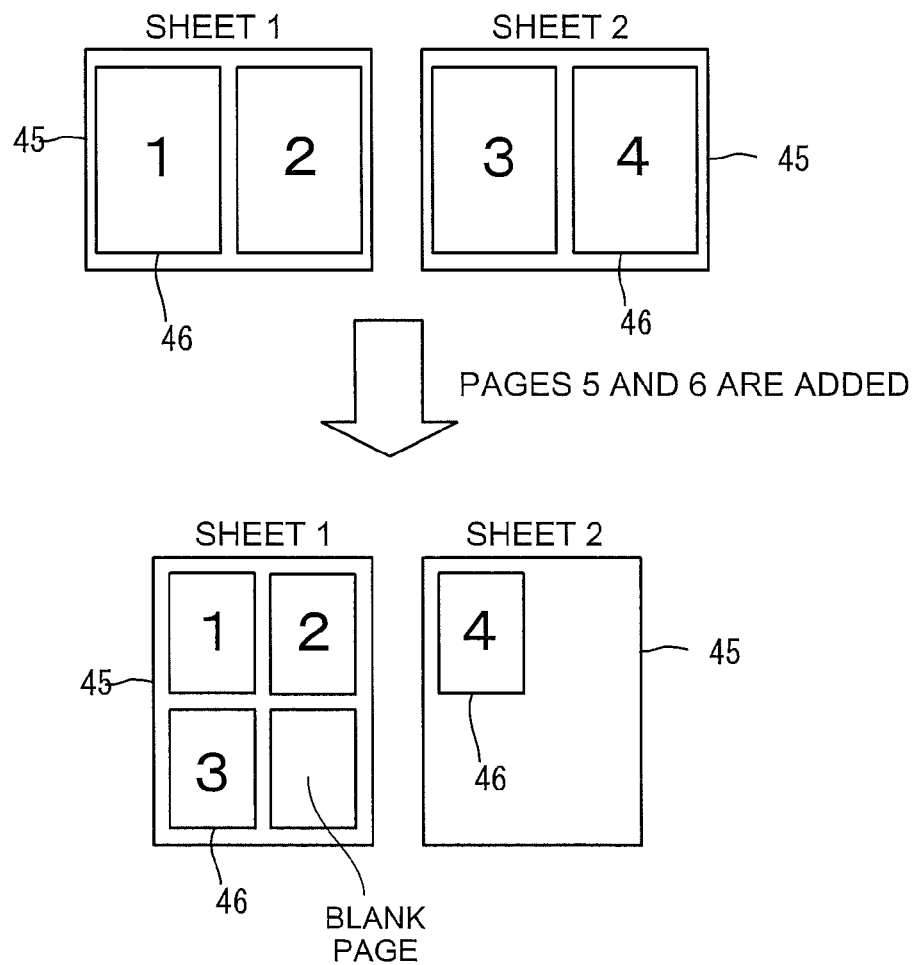
FIG. 12 is a diagram illustrating a change of the number of pages per sheet in a second illustrative embodiment according to one or more aspects of the disclosure.

In the example depicted in FIG. 12, the originally-specified value of the number of pages per sheet is changed to a greater value, e.g., to "4", from "2". When the pages (e.g., five pages in total) included in the page group to which one or more pages have been added are laid out by using the newly-specified value "4" of the number of pages per sheet, the number of printing sheets to be used is "2". Therefore, the number of pages per sheet may be increased such that the number of printing sheets to be used when the pages included in the page group to which the one or more pages have been added are laid out by using the newly-specified value of the number of pages per sheet may not become less than "2" which is the number of printing sheets to be used when the pages included in the page group (e.g., four pages in total) to which no page has been added are laid out by using the originally-specified value, e.g., "2", of the number of pages per sheet.

According to the second illustrative embodiment, the printer driver 19 is configured to change the originally-specified value of the number of pages per sheet to a value that is greater than the originally-specified value.

If the originally-specified value of the number of pages per sheet was not changed although the total number of pages in the page group was changed due to the addition of one or more pages after the number of pages per sheet had been changed, the number of printing sheets to be used is increased. According to the second illustrative embodiment, the printer driver 19 is configured to change the originally-specified value of the number of pages per sheet when the total number of pages in the page group was changed after the value of the number of pages per sheet had been specified by the user on the print condition setting screen 35. Therefore, this configuration prevents the increase of the number of printing sheets to be used although one or more pages are added to the page group after the value of the number of pages per sheet was specified by the user on the print condition setting screen 35.

Further, according to the second illustrative embodiment, the printer driver 19 is configured to change the originally-specified value of the number of pages per sheet to another value that is greater than the originally-specified value of the number of pages per sheet such that the number of printing sheets to be used when pages included in the page group to which one or more pages have been added are laid out by using the other value (i.e., a newly-specified value) of the number of pages per sheet is not less than the number of printing sheets to be used when the pages included in the page group to which no page has been added are laid out by using the originally-specified value of the number of pages per sheet. Therefore, printing may be performed on the number of printing sheets allowed by the user, fully using the space of the printing sheets.

In other embodiments, for example, the originally-specified value of number of pages per sheet may be changed to another value that may be greater than the originally-specified value such that the number of printing sheets to be used when pages included in the page group to which one or more pages have been added are laid out by using the other value (i.e., a newly-specified value) of the number of pages per sheet may not become less than the number of printing sheets to be used when the pages included in the page group to which one or more pages have been added are laid out by using the originally-specified value of the number of pages per sheet.

The aspects of the disclosure may not be limited to the specific illustrative embodiments described with reference to the above description and the accompanying drawings. For example, other embodiments described below may also be included within the technical scope of the disclosure.

In the above-described illustrative embodiments, the description has been made by using a physical printing sheet as an example of the sheet. Nevertheless, in other embodiments, for example, the sheet may be a logical printing sheet. For example, the sheet may be a virtual printing sheet to be displayed on a screen.

In the above-described illustrative embodiments, the description has been made by using print data as an example of output data. Nevertheless, in other embodiments, for example, the output data may be text data in Portable Document Format ("PDF"). When the text data is displayed on the display portion 13 after the originally-specified value of the number of pages per sheet was changed, pages included in a page group in which the total number of pages has been changed are laid out on one or more virtual printing sheets by using the newly-specified value of the number of pages per sheet.

In the above-described illustrative embodiments, the user may be allowed to select one of the first changing method and the second changing method. Nevertheless, in other embodiments, for example, the changing method of the number of pages per sheet may be fixed to one of the first changing method and the second changing method.

In the above-described illustrative embodiments, the user may be allowed to specify one of the options of "To be changed" and "Not to be changed" in the print setting item "pages-per-sheet change setting". Nevertheless, in other embodiments, for example, the user may not be allowed to specify any option in the print setting item "pages-per-sheet change setting" and the originally-specified value of the number of pages per sheet may always be changed when one or more pages are deleted from the page group.

In the above-described illustrative embodiments, the originally-specified value of the number of pages per sheet may not be changed when the option "off" is specified in the print setting item "toner saving setting". Nevertheless, in other embodiments, for example, the originally-specified value of the number of pages per sheet may be changed regardless of the setting value of the print setting item "toner saving setting" when one or more pages are deleted from the page group.

In the above-described illustrative embodiments, the pages-per-sheet changing method may be different for the double-sided printing and for the single-sided printing. Nevertheless, in other embodiments, for example, the originally-specified value of the number of pages per sheet may be changed by using the changing method for the single-sided printing at all times without depending on the setting value of the print setting item "double-sided printing/single-sided printing".

In the above-described illustrative embodiments, it may be determined whether the size of each page to be laid out by using the newly-specified value of the number of pages per sheet becomes smaller than the size of each page to be laid out by using the originally-specified value of the number of pages per sheet. When the size of each page to be laid out by using the newly-specified value of the number of pages per sheet becomes smaller, the originally-specified value of the number of pages per sheet may not be changed although one or more pages are deleted from the page group. Nevertheless, in other embodiments, for example, the originally-specified value of the number of pages per sheet may be changed without performing the above determination when one or more pages are deleted from the page group.

In the above-described illustrative embodiments, the printer driver 19 may be configured to display the preview screen 40. Nevertheless, in other embodiments, for example, the printer driver 19 may be configured to call an external program for displaying the preview screen 40 to display the preview screen 40.

In the above-described illustrative embodiments, the total number of pages in the page group may be changed by the user's instruction to delete one or more pages issued on the preview screen 40. Nevertheless, in other embodiments, for example, the total number of pages in the page group may be changed without using the preview screen 40.

In other embodiments, for example, when a blank page is included in the page group, the printer driver 19 may be configured to automatically delete the blank page to change the total number of pages in the page group.

In the above-described illustrative embodiments, the printer driver 19 may be configured to transmit data outputted by the application 17 to the printer 2. Nevertheless, in other embodiments, for example, a scanner may be adopted instead of the printer 2. That is, a scanner driver installed on the PC 1 may be configured to obtain data read by the scanner and lay out pages included in the data on a plurality of printing sheets.

In the above-described illustrative embodiments, the processing performed by the printer driver 19 may be also executed by printers, copying machines, facsimile machines, scanners, or appropriate devices. That is, the one or more aspects of the disclosure may be applied to a case where data received from an external device or data read by the device itself may be laid out on one or more printing sheets.

What is claimed is:

1. A non-transitory computer-readable storage device storing computer-readable instructions that, when executed, cause an information processing apparatus to perform:
   accepting a specified number of pages per sheet laid out on one side of a sheet;
   obtaining a page group including one or more pages;
   determining whether a total number of pages in the page group has changed;
   changing the specified number of pages per sheet when the total number of pages in the page group has changed;
   generating output data of the pages included in the page group in which the pages are laid out on each of one or more sheets in accordance with the specified number of pages per sheet, when the total number of pages in the page group has not changed; and
   generating output data of the pages included in the page group in which the pages are laid out on each of one or more sheets in accordance with the changed number of pages per sheet, when the total number of pages in the page group has changed.

2. The non-transitory computer-readable storage device according to claim 1, wherein the computer-readable instructions, when executed, further cause the information processing apparatus to perform:
   deleting at least one page from the page group after the number of pages per sheet is specified; and
   reducing the specified number of pages per sheet when the at least one page is deleted.

3. The non-transitory computer-readable storage device according to claim 2, wherein the computer-readable instructions, when executed, further cause the information processing apparatus to perform:
   calculating a first size of each page in the page group that is to be laid out on each of the one or more sheets in accordance with the specified number of pages per sheet;
   calculating a second size of each page in the page group that is to be laid out on each of the one or more sheets in accordance with the reduced number of pages per sheet;
   determining whether the second size is smaller than the first size; and
   using the specified number of pages per sheet when the second size is smaller than the first size whether or not the at least one page is deleted.

4. The non-transitory computer-readable storage device according to claim 2, wherein the computer-readable instructions, when executed, further cause the information processing apparatus to perform:
   obtaining a first number of sheets to be used when the pages remaining in the page group from which the at least one page has been deleted are laid out by using the reduced number of pages per sheet;

obtaining a second number of sheets to be used when the pages included in the page group from which no page has been deleted are laid out by using the specified number of pages per sheet; and reducing the specified number of pages per sheet such that the first number of sheets to be used does not exceed the second number of sheets to be used.

5. The non-transitory computer-readable storage device according to claim 2, wherein the computer-readable instructions, when executed, further cause the information processing apparatus to perform:

obtaining a first number of sheets to be used when the pages remaining in the page group from which the at least one page has been deleted are laid out by using the reduced number of pages per sheet;

obtaining a second number of sheets to be used when the pages remaining in the page group from which the at least one page has been deleted are laid out by using the specified number of pages per sheet; and reducing the specified number of pages per sheet such that the first number of sheets to be used does not exceed the second number of sheets to be used.

6. The non-transitory computer-readable storage device according to claim 2, wherein the computer-readable instructions, when executed, further cause the information processing apparatus to perform:

accepting a selection of one of a first changing method and a second changing method, wherein the first changing method is a method of changing the specified number of pages per sheet to another number of pages per sheet smaller than the specified number of pages per sheet such that the number of sheets to be used when the pages remaining in the page group from which the at least one page has been deleted are laid out by using the another number of pages per sheet does not exceed the number of sheets to be used when the pages included in the page group from which no page has been deleted are laid out by using the specified number of pages per sheet, and the second changing method is a method of changing the specified number of pages per sheet to another number of pages per sheet smaller than the specified number of pages per sheet such that the number of sheets to be used when the pages remaining in the page group from which the at least one page has been deleted are laid out by using the another number of pages per sheet does not exceed the number of sheets to be used when the pages remaining in the page group from which the at least one page has been deleted are laid out by using the specified number of pages per sheet; and changing the specified number of pages per sheet by using the selected changing method.

7. The non-transitory computer-readable storage device according to claim 1, wherein the computer-readable instructions, when executed, further cause the information processing apparatus to perform:

accepting a selection of one of a single-sided layout in which the pages are laid out on one side of each of the one or more sheets and a double-sided layout in which the pages are laid out on both sides of each of the one or more sheets; and changing, when the double-sided layout is selected, the number of pages per sheet such that one or more of the pages are laid out on the other side of the last sheet of the one or more sheets.

8. The non-transitory computer-readable storage device according to claim 1, wherein the computer-readable instructions, when executed, further cause the information processing apparatus to perform:

determining whether a colorant consumption in printing of the pages included in the page group needs to be saved; and using the specified number of pages per sheet when the colorant consumption in printing of the pages included in the page group needs to be saved whether or not the total number of pages in the page group has changed.

9. The non-transitory computer-readable storage device according to claim 1, wherein the computer-readable instructions, when executed, further cause the information processing apparatus to perform changing the total number of pages in the page group after the number of pages per sheet is specified.

10. The non-transitory computer-readable storage device according to claim 1, wherein the computer-readable instructions, when executed, further cause the information processing apparatus to perform printing the output data using one or more of a printer, a copying machine, a facsimile machine, and a scanner.

11. An information processing apparatus comprising:
a memory; and
a controller configured to;
accept a specified number of pages per sheet laid out on one side of a sheet;
obtain a page group including one or more pages;
determine whether a total number of pages in the page group has been changed;
change the specified number of pages per sheet when the total number of pages in the page group has changed;
generate output data of the pages included in the page group in which the pages are laid out on each of one or more sheets in accordance with the specified number of pages per sheet, when the total number of pages in the page group has not changed; and
generate output data of the pages included in the page group in which the pages are laid out on each of one or more sheets in accordance with the changed number of pages per sheet, when the total number of pages in the page group has changed.

12. The information processing apparatus according to claim 11, wherein the controller is further configured to:
delete at least one page from the page group after the number of pages per sheet are specified; and
reduce the originally-specified number of pages per sheet when the at least one page is deleted.

13. The information processing apparatus according to claim 12, wherein the controller is further configured to:
calculate a first size of each page in the page group that is to be laid out on each of the one or more sheets in accordance with the specified number of pages per sheet;
calculate a second size of each page in the page group that is to be laid out on each of the one or more sheets in accordance with the reduced number of pages per sheet;
determine whether the second size is smaller than the first size; and
use the originally-specified number of pages per sheet when the second size is smaller than the first size whether or not the at least one page is deleted.

14. The information processing apparatus according to claim 12, wherein the controller is further configured to:

obtain a first number of sheets to be used when the pages remaining in the page group from which the at least one page has been deleted are laid out by using the reduced number of pages per sheet;

obtain a second number of sheets to be used when the pages included in the page group from which no page has been deleted are laid out by using the specified number of pages per sheet; and reduce the specified number of pages per sheet such that the first number of the sheets to be used does not exceed the second number of sheets to be used.

15. The information processing apparatus according to claim 12, wherein the controller is further configured to:

obtain a first number of sheets to be used when the pages remaining in the page group from which the at least one page has been deleted are laid out by using the reduced number of pages per sheet;

obtain a second number of sheets to be used when the pages remaining in the page group from which the at least one page has been deleted are laid out by using the specified number of pages per sheet; and reduce the originally-specified number of pages per sheet such that the first number of sheets to be used does not exceed the second number of sheets to be used.

16. The information processing apparatus according to claim 12, wherein the controller is further configured to:

accept a selection of one of a first changing method and a second changing method, wherein the first changing method is a method of changing the specified number of pages per sheet to another number of pages per sheet smaller than the specified number of pages per sheet such that the number of sheets to be used when the pages remaining in the page group from which the at least one page has been deleted are laid out by using the another number of pages per sheet does not exceed the number of sheets to be used when the pages included in the page group from which no page has been deleted are laid out by using the specified number of pages per sheet, and the second changing method is a method of changing the specified number of pages per sheet to another number of pages per sheet smaller than the specified number of pages per sheet such that the number of sheets to be used when the pages remaining in the page group from which the at least one page has been deleted are laid out by using the another number of pages per sheet does not exceed a number of sheets to be used when the pages remaining in the page group from which the at least one page has been deleted are laid out by using the specified number of pages per sheet; and change the specified number of pages per sheet by using the selected changing method.

17. The information processing apparatus according to claim 11, wherein the controller is further configured to:

accept a selection of one of a single-sided layout in which the pages are laid out on one side of each of the one or more sheets and a double-sided layout in which the pages are laid out on both sides of each of the one or more sheets; and change, when the double-sided layout is selected, the number of pages per sheet such that one or more pages of the pages are laid out on the other side of the last sheet of the one or more sheets.

18. The information processing apparatus according to claim 11, wherein the controller is further configured to:

determine whether a colorant consumption in printing of the pages included in the page group needs to be saved; and use the specified number of pages per sheet when the colorant consumption in printing of the pages included in the page group needs to be saved whether or not the total number of pages in the page group has changed.

19. The information processing apparatus according to claim 11, wherein the controller is further configured to change the total number of pages in the page group after the number of pages per sheet is specified.

20. The information processing apparatus according to claim 11, wherein the computer-readable instructions, when executed, further cause the information processing apparatus to perform printing the output data using one or more of a printer, a copying machine, a facsimile machine, and a scanner.

* * * * *